United States Patent [19]

Eng

[11] 4,102,194

[45] Jul. 25, 1978

[54] ELECTRONIC BIN TEMPERATURE MONITOR

[75] Inventor: William T. Eng, Springfield, Ill.

[73] Assignee: Dickey-john Corporation, Auburn, Ill.

[21] Appl. No.: 724,731

[22] Filed: Sep. 20, 1976

[51] Int. Cl.² .......................... G01K 1/02; G01K 3/00
[52] U.S. Cl. ........................................ 73/340; 73/342; 340/517; 340/598
[58] Field of Search .......... 73/340, 341, 342, 362 AR, 73/362 SG; 340/228 R

[56] References Cited

U.S. PATENT DOCUMENTS

| | | | |
|---|---|---|---|
| 2,549,401 | 4/1951 | Stein et al. | 73/341 X |
| 2,677,276 | 5/1954 | Schmidt | 73/342 X |
| 2,718,148 | 9/1955 | Knudsen | 73/342 |
| 2,942,471 | 6/1960 | Hefti et al. | 73/341 |
| 3,653,262 | 4/1972 | Ehrenfried et al. | 73/342 X |
| 3,775,761 | 11/1973 | Kobayashi et al. | 340/228 R |
| 3,791,217 | 2/1974 | Stout et al. | 73/342 |
| 3,812,717 | 5/1974 | Miller et al. | 73/362 SC |

*Primary Examiner*—Anthony V. Ciarlante
*Attorney, Agent, or Firm*—Olson, Trexler, Wolters, Bushnell & Fosse, Ltd.

[57] ABSTRACT

An electronic bin temperature monitor is disclosed which automatically scans a plurality of temperature sensors which are disposed about the interior of a grain storage bin so that the temperatures at various locations in the stored grain can be monitored. The temperature sensors, which are selected silicon diodes with a linear negative temperature coefficient, are connected by cables to an external monitoring unit, which is provided with digital readouts to display both the location number of the sensor at which the temperature is being read and the temperature at that sensor location. Also provided, in common to all the sensors in a particular bin, is a pre-set alarm function which causes an external alarm device to be triggered, whenever any individual sensor temperature reaches or exceeds a pre-set temperature.

6 Claims, 7 Drawing Figures

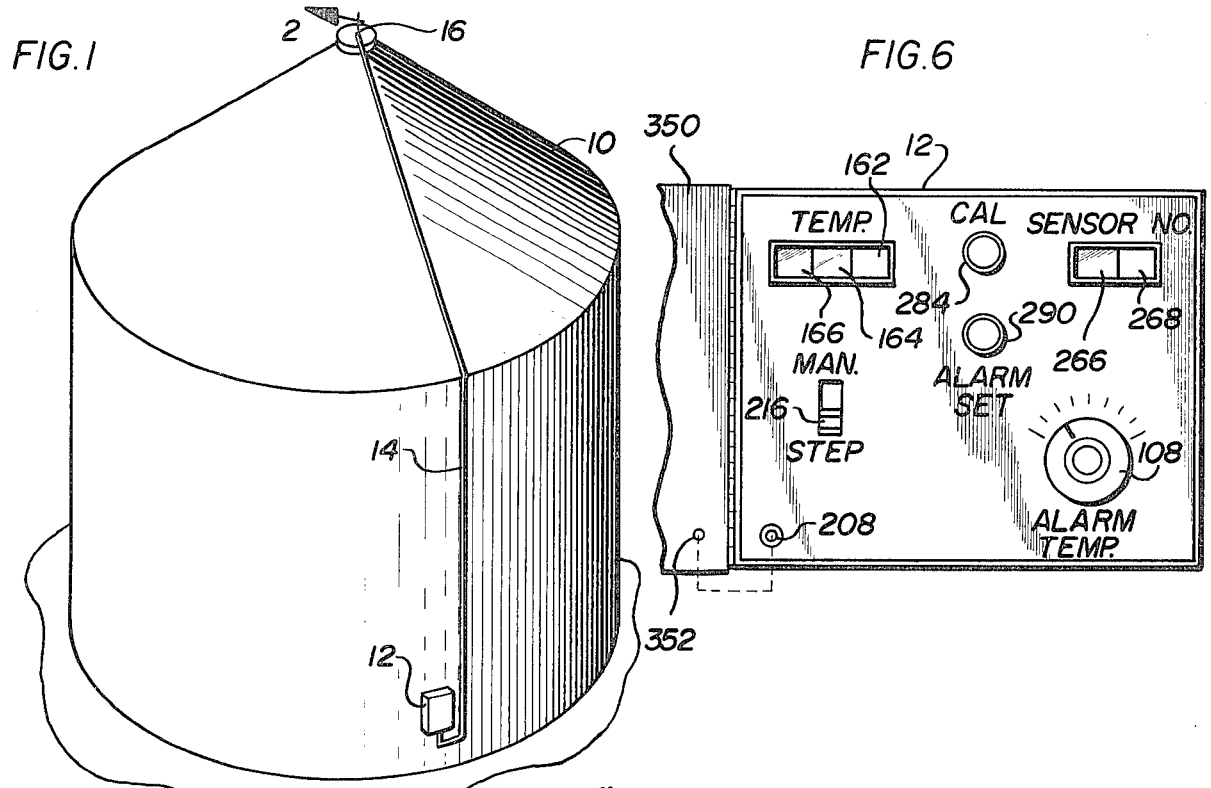
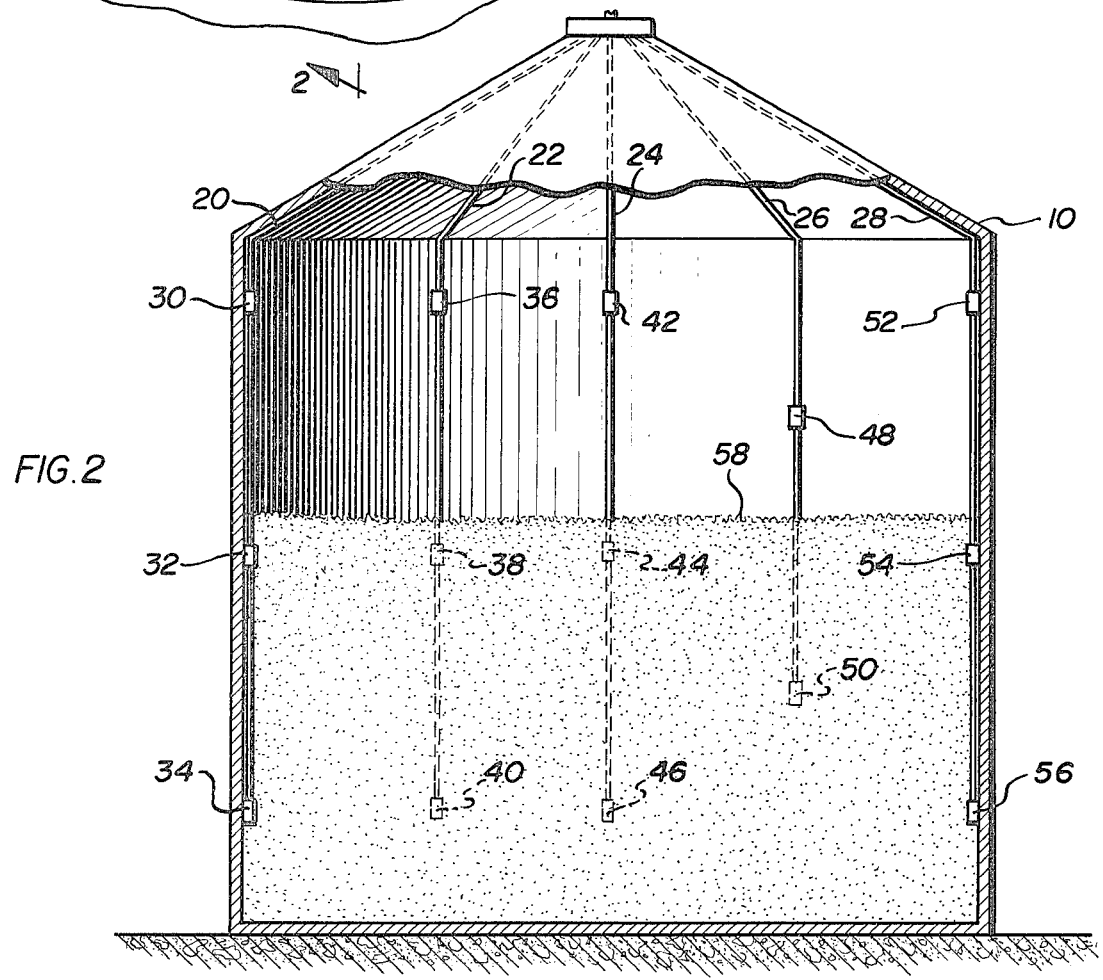

FIG.4
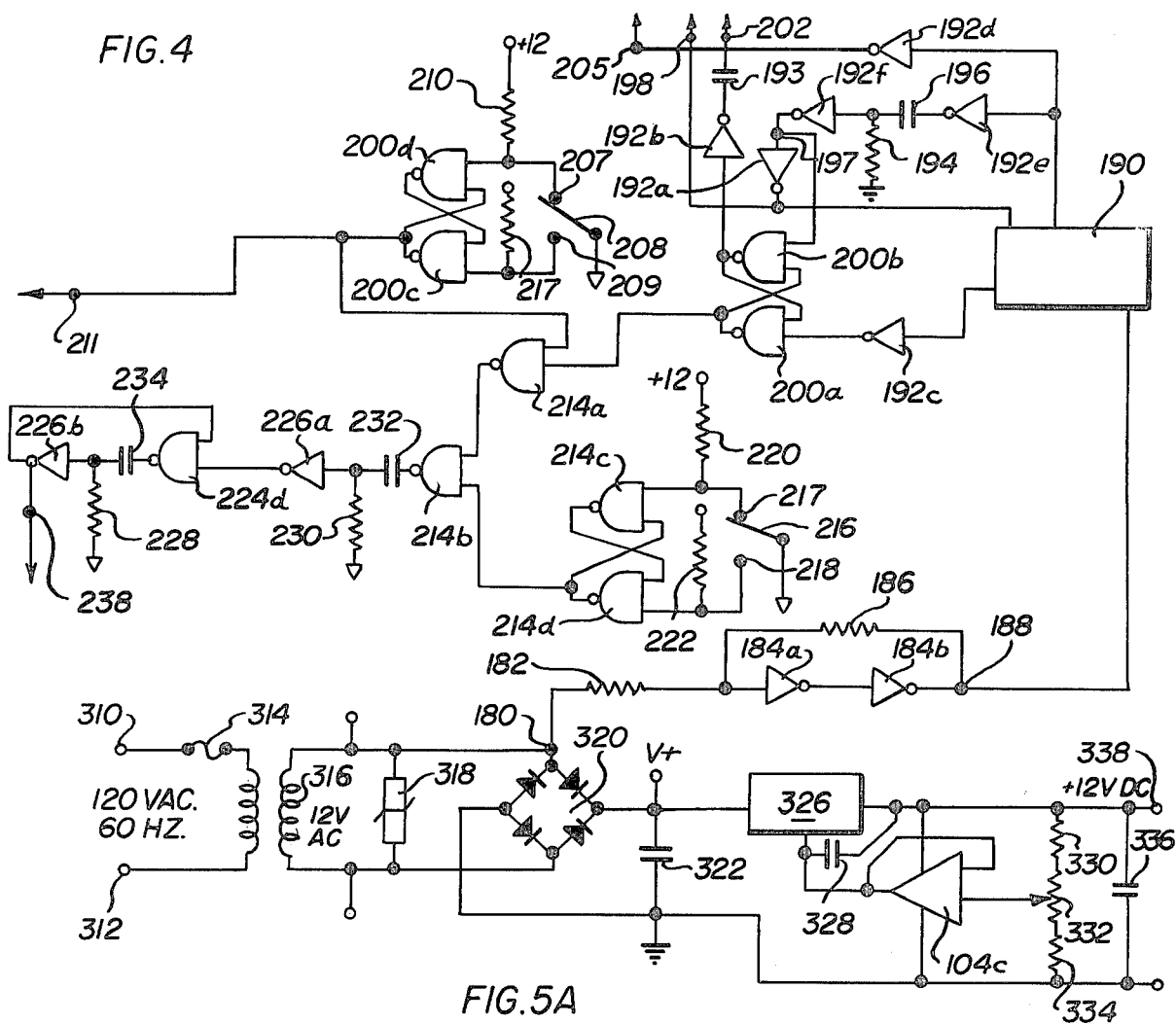
FIG.5A
FIG.5B
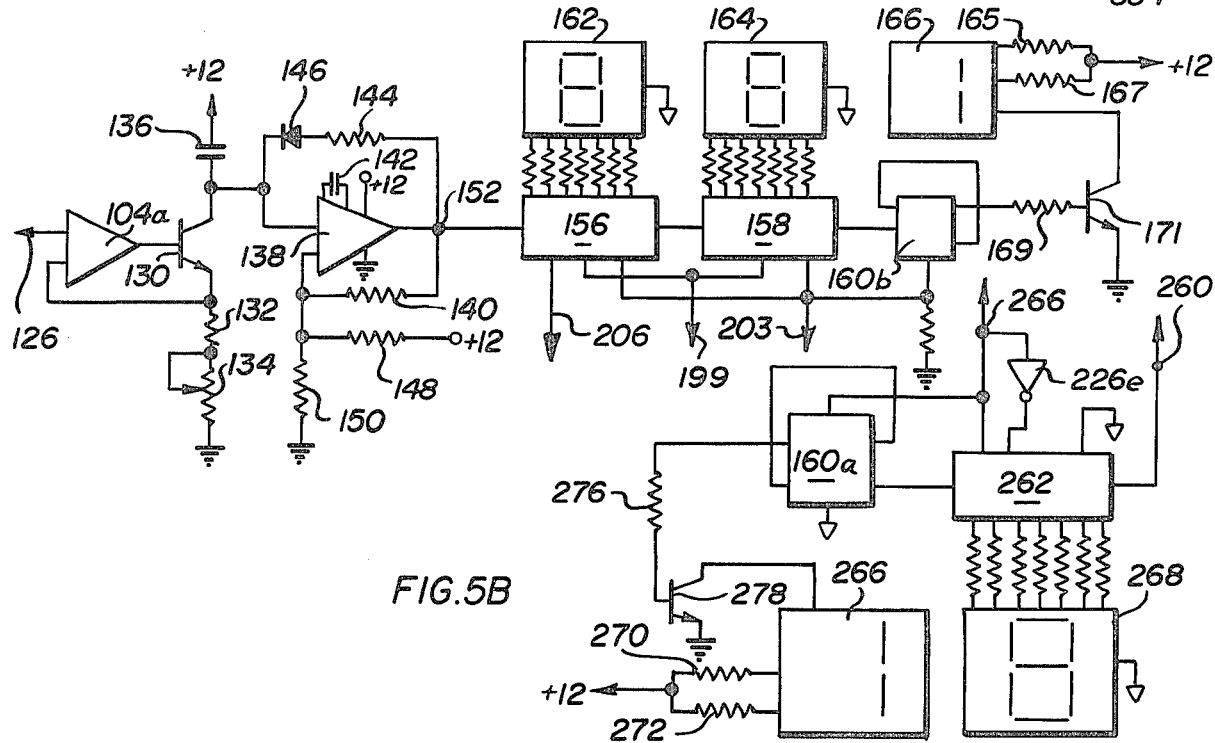

ELECTRONIC BIN TEMPERATURE MONITOR

BACKGROUND AND OBJECTS OF THE INVENTION

The present invention relates to a novel monitoring apparatus, and more specifically, to a novel apparatus for monitoring temperature. While the features of this invention may be adapted for many different uses, the disclosure will be facilitated by directing it particularly to the problem of monitoring the temperature of grain stored in a bin.

As is well known, a farmer engaged in the growing of grain crops, makes use of storage bins to store the grain for periods of time. It is desirable to store the grain in a bin, in such a manner that the grain is reasonably protected from rotting or spoilage. In order to prevent such rotting or spoilage of the grain, it is desirable that the grain remain reasonably dry while in the storage bin. As it is difficult or even impossible to physically check a relatively large amount of grain in a storage bin from time-to-time for moisture or spoilage, it is helpful to have a monitoring system with appropriate sensors disposed in various locations within the grain, to continuously monitor. It is also known, that if molding or spoilage develops in a given location in a mass of grain, the temperature will rise at that location. Therefore, an appropriate monitoring system comprises sensors disposed in various locations within the mass of grain being stored, adapted to detect the temperatures at those locations.

It is an important object of the present invention, therefore, to provide a novel apparatus whereby the stored grain may be continuously and accurately monitored, enabling a farmer instantly to determine whether spoilage is occurring.

A more specific object of the present invention is to provide a novel apparatus substantially responsive to temperature at various discrete locations within the mass of grain being stored enabling a farmer to determine any location where spoilage is occurring.

A further important object of the present invention is to provide a novel monitoring apparatus capable of accurately and reliably responding to and sensing the temperature at various discrete locations within any large mass of material, such as grain in storage.

A further important object of the present invention is to provide a novel monitoring apparatus of the above-described type which apparatus includes a novel circuit for detecting the temperature in a number of discrete locations within a mass of material.

A more specific object of the present invention is to provide a novel detecting circuit, which includes provisions for a direct readout of the temperature in various locations of the grain being stored, and an alarm system which may be set to trigger an external alarm device whenever any of these sensor location temperatures match or exceed a pre-set temperature.

SUMMARY OF THE INVENTION

The present invention includes a number of temperature sensors comprising selected silicon diodes which are known to have a linear negative temperature coefficient disposed in various discrete locations in a grain storage structure such that the grain temperatures in these various locations can be monitored. Also included is an external alarm device and circuitry for setting in a desired maximum temperature, so that when the temperature of any sensor location meets or exceeds the pre-set temperature, the alarm device will be triggered. Further included in the present invention is circuitry for providing a readout of the temperatures at various sensor locations and which has provision for being either automatically sequenced through the various sensor locations, or being manually shifted from one sensor position to the next, as well as a visual numerical readout identifying the sensor location being monitored. The invention also includes circuitry for detecting and excluding any spurious signals which result in a false indication of an excessive temperature at one or more sensor locations, when, in fact, the temperature is below the pre-set maximum. Provision is also made for calibrating the system and for switching out any sensors not in the grain to insure accurate temperature readouts.

Other objects and advantages of the present invention will become apparent from the following description of the accompanying drawings wherein:

FIG. 1 is an elevational view of a grain storage bin in combination with the readout and control panel of the present invention and connecting-means running to the interior of the bin.

FIG. 2 is a sectional view of the bin of FIG. 1, showing the interior of the bin with a number of sensors being disposed in various locations therein and connecting-means running to the exterior of the bin.

Figure 3:
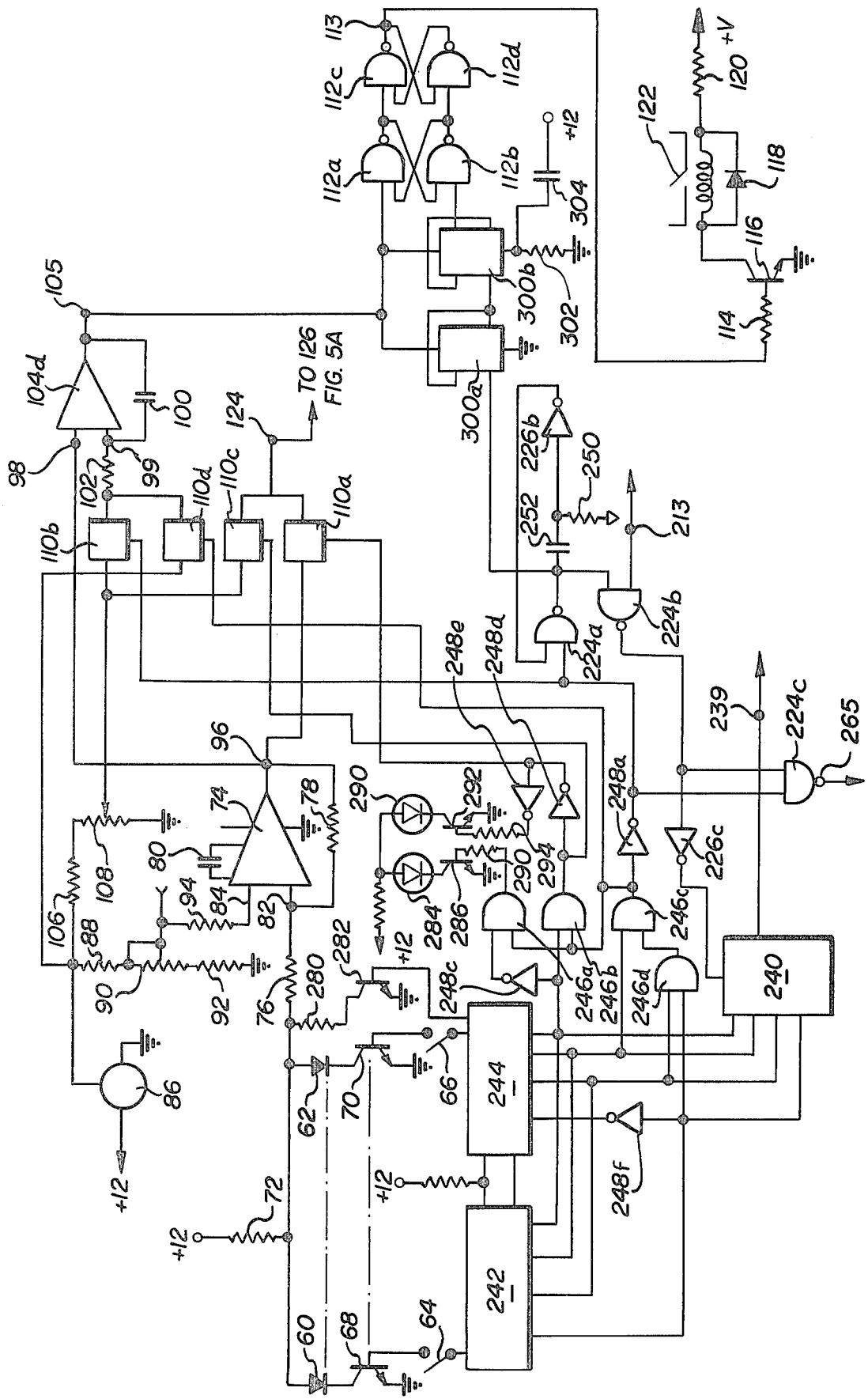
FIG. 3 is an electrical schematic view of an embodiment of a portion of a detection circuit incorporating features of the present invention.

FIG. 4, FIGS. 5(a) and 5(b) are electrical schematic views of an embodiment of additional portions of a detection circuit incorporating features of the present invention; and FIG. 6 is a more detailed view of the readout and control panel of FIG. 1.

DETAILED DESCRIPTION

Referring now more specifically to the drawings, FIG. 1 shows an elevational view of a grain storage bin 10. Attached to the bin 10 is a control and readout panel 12 and connecting-means 14 running to the top of the bin to where there are means 16 for entering the bin.

FIG. 2 shows a cut away view of the interior of the storage bin of FIG. 1. Connecting-means 20, 22, 24, 26 and 28, connected to the connecting-means 14 of FIG. 1, continue on the inside of the bin to complete the connection between the aforementioned control and readout panel 12 with the temperature sensors 30, 32, 34, 36, 38, 40, 42, 44, 46, 48, 50, 52, 54 and 56 which are disposed at various locations about the bin, and in the grain 58. Provision is made, as will be shown later, for the bin being filled to any level with grain, resulting in some sensors being in the grain and some being suspended above the level of the grain. Although fourteen sensors are used in the illustrated embodiment, it will be understood that any number of sensors desired may be used in accordance with the present invention.

Referring now to FIG. 3, a portion of the monitoring circuitry is shown. Diodes 60 and 62 are the first and fourteenth respectively of the fourteen temperature sensing diodes of the system. Whenever the grain is below the level of any particular temperature sensing diode, the diode must be switched out of the system so that a false alarm cannot occur due to the alarm setting being below the ambient temperature of the air in the storage structure. This function is performed by switches 64 and 66 and transistors 68 and 70 which are interconnected with the diodes 60 and 62. Whenever one of the diodes, such as diode 60 is not in the grain, its corresponding switch 64, for example, is opened, thereby causing the transistor 68 to hold the signal at diode 60 at the positive supply. When diode 60 is in the grain, the switch 64 is closed allowing the signal on diode 60 to be processed through the system. The selected silicon diodes have a linear negative temperature coefficient. Therefore, as the temperature increases, the voltage drop across the diode decreases, and vice versa.

The alarm and temperature readout functions of the apparatus may be described by reference to a representative temperature sensor diode 60. The aforementioned voltage drop across the diode 60 is fed to a scaler amplifier, comprising the operational amplifier of integrated circuit 74, resistors 76 and 78, and capacitor 80. The sensor diode signal at the input 82 of the operational amplifier of integrated circuit 74 is scaled by comparing it to a reference voltage provided by resistors 88, 92, 94 and variable resistor 90, which are connected as a voltage divider from a reference voltage provided by the voltage regulator of integrated circuit 86. The output 96 of the scaler amplifier then provides a slope of 10 millivolts per degree Fahrenheit. This output signal at 96 is fed to terminal 98 of a voltage comparator circuit comprising resistor 102, capacitor 100 and the operational amplifier 104d of integrated circuit package 104. A pre-set reference voltage at the other terminal 99 of the operational amplifier 104d is provided by variable resistor 108 which, with resistor 106, functions as a voltage divider for the voltage from voltage regulator 86. The reference voltage is gated through the gate 110b of integrated circuit package 110. If the signal voltage representing the temperature at diode 60, appearing at terminal 98 exceeds the pre-set reference voltage signal appearing at terminal 99, the output of the operational amplifier 104, appearing at terminal 105 will be positive, causing the set-reset flip-flop, comprising gates 112a, 112b, 112c and 112d of integrated circuit package 112, to set, which causes the signal to be sent through to the alarm circuit.

The alarm circuit comprises resistors 114 and 120, transistor 116, diode 118, and a set of dry contacts 122. When the signal from the aforementioned flip-flop is fed through to the alarm circuit, it forces the closure of contacts 122, causing the alarm means to be triggered. All of the temperature diodes associated with the system operate in the same manner, with regard to the alarm function.

The output of the scaler amplifier at terminal 96 is also fed through the gate 110a of integrated circuit package 110 to terminal 124, which is connected to terminal 126 of FIG. 5a. Referring to FIG. 5a, the temperature signal at 126 enters the analog to digital conversion stage, which functions as follows: A voltage-to-frequency converter includes a voltage controlled current sink which comprises operational amplifier 104a of integrated circuit package 104, transistor 130, resistors 132 and 134, and capacitor 136, and an analog voltage comparator which comprises the operational amplifier integrated circuit 138, resistors 140, 144, 148, 150, capacitor 142 and diode 146. The voltage comparator has positive feedback provided by resistor 140, timing provided by capacitor 142 and a discharge circuit provided by diode 146 and resistor 144. The above-described analog to digital conversion stage provides a temperature signal in digital form at terminal 152, connected to the display system which displays the temperature as follows: A 2½ digit counter is made up of two decade counters, integrated circuits 156 and 158 and a single flip-flop 160b of integrated circuit package 160 which counts only the 100th input pulse. The readout thus has a maximum display of 199. The 2½ digit counter provides an output suitable to drive the segmented display, made up of display units 162, 164 and 166.

Referring now to FIG. 4, a timing circuit is shown which functions as follows: a Schmitt trigger comprising the inverters 184a and 184b of integrated circuit package 184, and resistors 182 and 186 is fed from the 60-cycle line at 180. The resistor values are chosen so that the Schmitt trigger has a 45% hysteresis. The output of the Schmitt trigger at terminal 188 is then fed to a divider comprising integrated circuit 190 which provides an output pulse width of 16/60 second as the time base. A reset circuit for the divider 190 is provided comprising control gates 192e, 192f and 192a of integrated circuit package 192, resistor 194 and capacitor 196. This reset circuit in conjunction with gate 192d of integrated circuit package 192, is also used to enable the display time for the temperature readout at counters 156 and 158 of FIG. 5a through terminals 198 and 205 which connect to terminals 199 and 206 respectively of FIG. 5a. The divider 190 also provides pulses to the circuit comprising gates 192e, 192f of integrated circuit package 192, resistor 194, capacitor 196, the gate 192c of integrated circuit package 192, the gates 200a and 200b of integrated circuit package 200 which form a set-reset latch and the gate 192b of integrated circuit package 192, and capacitor 193, which circuit resets the 2½ digit counter made up of integrated circuits 156, 158 and 160b of FIG. 5a, through terminal 202 which is connected to terminal 203 of FIG. 5a, prior to each successive reading.

Referring again to FIG. 4, the circuitry makes provision for either automatic or manual scanning of the temperature measurements at the fourteen sensor diodes. In the automatic mode of scanning, the switch 208, which is a push-pull switch, is pushed in to make contact with terminal 209. This sets the set-reset latch comprising gates 200c and 200d of integrated circuit package 200 which enables gate 214a of integrated circuit package 214, which in turn passes the clocking pulses from the timing circuit previously described, from the divider 190 and gate 192c of integrated circuit package 192 and the latch made up of gates 200a and 200b of integrated circuit package 200 to gate 214b of integrated circuit package 214.

In the manual mode, push-pull switch 208 is pulled out to make contact with terminal 207, which through the latch made up of gates 200c and 200d disables gates 214a, thus preventing the clocking pulses from passing through gate 214b. In this mode of operation the gate 214b receives pulses from the circuitry comprising switch 216, resistors 220 and 222, and gates 214c and 214d which are connected to form a set-reset latch. The switch 216 is manually switched between terminals 217 and 218, to provide pulses to gate 214b.

In either mode of operation, gate 214b of integrated circuit package 214 passes on the clocking pulses to a pulse width reduction circuit comprising gate 224d of integrated circuit package 224, and gates 226a and 226b of integrated circuit package 226, resistors 228 and 230, and capacitors 232 and 234. The narrow pulse output of the pulse width reducer at terminal 238 controls the scanning of the temperature sensors as described below.

Referring again to FIG. 3 terminal 239 is connected to terminal 238, of FIG. 4, the output of the pulse width reducer circuit. The pulses at terminal 239 clock the sensor address counter integrated circuit 240 on the leading edge. The sensor address counter 240 then addresses two eight bit multiplexer integrated circuits 242 and 244 which in turn connect each sensor into the system in sequential order. Gate 248f of integrated circuit package 248 serves to switch out 244 when 242 is selecting sensors and switches in 244 as it is needed to select the remaining sensors. When the system is in the automatic scanning mode, only the fourteen addresses or selections corresponding to the fourteen temperature sensors are available to the multiplexers 242 and 244. Gates 246c and 246d of integrated circuit package 246 decode the fifteenth address from the address counter integrated circuit 240 and immediately reset the address counter back to its first address via the gate 248a of integrated circuit package 248, the one-shot comprising gate 224a of integrated circuit package 224, gate 226b of integrated circuit package 226, resistor 250 and capacitor 252, and the gate 226c of integrated circuit package 226. This bypasses the fifteenth and sixteenth addresses of the counter 240, so that the cycle comprises only fourteen addresses, hence, involving interrogation of the fourteen temperature sensors.

Referring to FIG. 5b, the temperature sensor identification number readout functions as follows:

The sensor readout address counter comprising integrated circuits 262 and 160a is clocked by the trailing edge of the pulses from the pulse width reducer of FIG. 4, whose output at terminal 238 enters at terminal 260 of FIG. 5b. The leading edge of the same pulses was used, as described above, to clock the sensor address counter 240 of FIG. 3. Thus, as each sensor is switched into the circuitry to be monitored, the same pulse which caused it to be switched in pulses the sensor readout counter up another count, thereby causing the digital readout devices 266 and 268 to advance another number, corresponding to the number of the temperature sensor being monitored. Similarly, in the automatic scanning mode, the pulses which reset the address counter 240 of FIG. 3 back to its first address on the fifteenth clock pulse, also reset the readout counters 160a and 262 of FIG. 5b through the gate 224c of FIG. 3, which is connected by terminal 265 to terminal 266 of FIG. 5b.

In the manual scanning mode of operation, referring to FIG. 4, the switch 208 is in contact with terminal 207, causing the set-reset latch formed by gates 200c and 200d in integrated circuit package 200, to disable gate 224b of integrated circuit package 224 in FIG. 3 through the connecting means between terminal 213 of FIG. 3 and terminal 211 of FIG. 4. This prevents the one-shot circuitry of FIG. 3 from passing the pulses in the fifteenth address, as described above, which reset the address counter and the readout counter to their first positions. Thus, in the manual mode, the fifteenth and sixteenth addresses are available for the operations described as follows. Referring to FIG. 3, in the fifteenth address, a fixed pseudo-temperature comprising resistor 280 of a known predetermined value, and transistor 282, connected in parallel to the temperature sensors, is provided to check the calibration of the analog to digital converter of FIG. 5a. In the fifteenth address, the address counter 240 and multiplexer 244 switch in this pseudo-temperature resistor whose signal is displayed on the readout in the same manner as the signals from the other temperature sensors, as described above. The analog to digital converter of FIG. 5a, may then be calibrated using variable resistor 134 of FIG. 5a. Also, light emitting diode 284 turns on to indicate the calibration position.

The circuit for turning on light emitting diode 284 comprise resistor 290 and transistor 286, gate 248c of integrated circuit package 248, the gates 246a, 246c and 246d of integrated circuit package 246 which decodes the fifteenth address. Also, in the fifteenth as well as the sixteenth address, the preset alarm function is disabled by disabling gate 110b of integrated circuit package 110 through gate 248a and gates 246c and 246d which are pulsed in the fifteenth and sixteenth addresses as already described, and enabling gate 110d of integrated circuit package 110 also through gates 246c and 246d of integrated circuit package 246 so that the voltage comparator 104d has its terminal 99 switched directly to the output of voltage regulator 86 forcing its output low, so that the alarm will not be sounded. The sensor identification number readout is also disabled in the fifteenth and sixteenth addresses by gate 224c of FIG. 4 which passes the pulses of the fifteenth and sixteenth address decoder gates 246c and 246d from terminal 265 to terminal 266 of FIG. 5b, and gate 226e of FIG. 5b.

In the sixteenth address, the light emitting diode 290 is turned on to indicate the set alarm position, through transistor 292 and resistor 294 and the sixteenth address decoder comprising gates 248e and 248d of integrated circuit package 248, gate 246b, gate 246c and gate 246d of integrated circuit package 246 in the same manner as light emitting diode 284 was turned on previously for the fifteenth position, Gate 246b also enables gate 110c, which permits the alarm set temperature as set on variable resistor 108 to be gated through to point 126 of FIG. 5a, so that the alarm temperature set may be read out in the same manner as the temperature of the temperature sensors is read out, as described above. At the same time, gate 248d, which is pulsed through gates 246b, 246c, and 246d in the sixteenth address, is disabled, thus disabling gate 110a of integrated circuit package 110 and cutting off the output of the scaler amplifier 74 to the readouts in this position. With the next advancing pulse from the step switch 216 of FIG. 4, address 1 is again returned and the manual cycle may be repeated.

The system also includes provisions so that if, during normal operation, a false alarm signal, such as a voltage transient, occurs and triggers the alarm, the alarm device will only be active for two automatic scanning cycles maximum. The circuitry performing this function, in FIG. 3 is as follows: Integrated circuits 300a and 300b of integrated circuit package 300, resistors for 302 and capacitor 304 are connected to form a divide-by-four counter which functions as a digital filter. This counter is clocked by the completion of every fourteenth sensor interrogation via gate 224a of integrated circuit package 224, which is pulsed by the fifteenth counting pulse as decoded by gates 246d and and 246c of integrated circuit package 246 and transmitted through gate 248a. Every second pulse from the gate 224a, then, will cause the divide-by-four counter to reset the set-reset latch comprising the gates 112, 112b, 112c and 112d of integrated circuit package 112, thus preventing the alarm 122 from sounding. If, however, the alarm condition is a legitimate one, the alarm signal from terminal 105, at the output of operational amplifier 104d, will reset the divide-by-four counter each scan cycle, thus preventing the counter from resetting the set-reset latch.

When an alarm does occur, the automatic scanning cycle does not cease. Thus, in investigating an alarm, all of the sensors must be scanned to ascertain which areas of the grain are exceeding the preset alarm temperature.

Also shown in FIG. 4 is the power supply for all of the circuitry of FIGS. 3, 4 and 5. Terminals 310 and 312 are connected to the 120-volt AC, 60 hertz power line. Fuse 314 is inserted in the positive supply line, and transformer 316 provides 12 volts AC to the regulator circuit. The regulator circuit comprises Zener diode 318, connected to full wave rectifier 320, whose output is connected to the circuit comprising the voltage regulator of integrated circuit package 326, the operational amplifier 104c of integrated circuit package 104, capacitors 322, 328 and 336, resistors 330 and 334, and variable resistor 332. The 12-volt DC output of the voltage regulator circuit appears at terminal 338.

Referring to FIG. 6, the console containing the controls and readout panels is shown. The console 12 is equipped with a door 350, which has means 352 for pushing in the push-pull switch 208 which causes the apparatus to go into its automatic scanning mode of operation, as described above when the door 350 is closed. When the door 350 is open the switch 208 must be physically pulled out for manual scanning operation. In this mode, the temperature readout of digital display elements 162, 164 and 166 continuously repeats itself until the next sensor is switched in by means of the manual step switch 216. This manual mode of operation permits record taking. Also shown in FIG. 6 are the sensor number identification indicators, digital display elements 266 and 268, the calibrate position indicator 284, the alarm set position indicator 290, and the potentiometer 108 for setting-in the desired temperature, the functions of which have been described above.

As a specific example to which no limitation on is intended, the designations of the integrated circuit packages of the illustrated embodiment of the invention are as follows:

| I.C. Package Number | Designation |
| --- | --- |
| 112, 200, 214, 224 | CD4011 |
| 246 | CD4081 |
| 104 | LM324 |
| 74 | CA3130 |
| 110 | CD4066 |
| 86 | AD580 |
| 326 | 7808 UC |
| 156, 158, 262 | SCL4426 |
| 190, 240 | CD4024 |
| 242, 244 | CD4051 |
| 160, 300 | CD4013 |
| 184, 192, 226, 248 | CD4069 |

The invention is claimed as follows:

1. An apparatus for monitoring the temperature of grain in a storage bin comprising: temperature sensing circuit means including a plurality of sensors and a calibration resistance, each said sensor respectively disposed in one of a plurality of discrete locations within said storage bin to sense the temperature of the grain at each of said locations and develop a corresponding electrical temperature signal, and said calibration resistance provides a calibration temperature signal; scaling amplifier means responsive to said plurality of temperature signals and said calibration temperature signal to provide a scaled temperature signal, scanning circuit means including a digital electronic multiplexer circuit connected with said temperature sensing circuit means and said scaling amplifier means for effectively coupling each of said temperature signals and said calibration temperature signal to said scaling amplifier in a predetermined sequence, alarm means, adjustable alarm circuit means connected with said scaling amplifier means and for producing an electrical signal corresponding to a desired maximum temperature, means for receiving and comparing said scaled temperature signal and said desired maximum temperature signal and producing an alarm signal for actuating said alarm means whenever the temperature of the grain at the associated location meets or exceeds said desired maximum temperature, digital electronic readout circuit means connected to said scaling amplifier means and responsive to said scaled temperature signal for sequentially providing a digital display of said grain temperature at each said discrete location.

2. The apparatus of claim 1 wherein said sensors comprise selected silicon diodes having a linear negative temperature coefficient.

3. The apparatus of claim 1 wherein said scanning circuit means includes a counter connected for operation simultaneously with said digital electronic multiplexer circuit for providing a location signal corresponding to the location of the temperature sensor connected thereby, said scanning circuit means further includes means for actuating said digital electronic multiplexer selectively for automatically or manually performing said connecting, and wherein said apparatus further includes second digital display means responsive to said location signal for providing a digital display for identifying the location of the temperature being displayed.

4. The apparatus of claim 1, which further includes a console, and wherein all said means except said sensor are contained within said console, with said console further including closure means, and further including means for actuating said multiplexer for selectively automatically or manually performing said effective coupling includes first switch means, said digital electronic multiplexer circuit operating automatically and repeatedly in said predetermined sequence when said first switch means is activated, said closure means including means for activating said first switch means when closed.

5. The apparatus of claim 4 further including second switch means manually actuatable for causing said digital electronic multiplexer circuit to connect one sensor in said predetermined sequence in response to each actuation of said second switch means, said first switch means further being deactivatable to cause said multiplexer to operate manually, as controlled by said second switch means.

6. The apparatus of claim 1, further including electronic digital filter means comprising a digital electronic counter circuit and a latching circuit coupled between said receiving and comparing means and said alarm means and responsive to said digital electronic multiplexer circuit for resetting said latching circuit after each two repetitions of said predetermined sequence, thereby preventing false alarms.

* * * * *